United States Patent [19]

Ingram, II

[11] 4,048,125

[45] * Sept. 13, 1977

[54] ANTI-MIGRATORY ADDITIVE FOR EMULSIFIED PHENOLIC RESIN SYSTEMS CONTAINING A PROTEINACEOUS COLLOID

[75] Inventor: Woodrow Hayes Ingram, II, Hampden, Mass.

[73] Assignee: Monsanto Company, St. Louis, Mich.

[ * ] Notice: The portion of the term of this patent subsequent to May 30, 1989, has been disclaimed.

[21] Appl. No.: 636,476

[22] Filed: Dec. 1, 1975

Related U.S. Application Data

[60] Division of Ser. No. 323,680, Jan. 15, 1973, Pat. No. 3,932,333, which is a continuation-in-part of Ser. No. 142,905, May 13, 1971, Pat. No. 3,719,616, which is a continuation-in-part of Ser. No. 8,679, Feb. 4, 1970, abandoned.

[51] Int. Cl.$^2$ .................. C08L 89/00; C08L 89/02
[52] U.S. Cl. .................................... 260/7; 260/29.3; 428/220; 428/478; 428/530

[58] Field of Search ........................................... 260/7

[56] References Cited

U.S. PATENT DOCUMENTS

| | | | |
|---|---|---|---|
| 3,092,595 | 6/1963 | Smith et al. | 260/7 X |
| 3,326,825 | 6/1967 | Clougherty et al. | 260/7 X |
| 3,666,694 | 5/1972 | Ingram | 260/7 |
| 3,719,616 | 3/1973 | Ingram | 260/7 |
| 3,932,333 | 1/1976 | Ingram | 260/29.3 |

Primary Examiner—Howard E. Schain
Attorney, Agent, or Firm—Joseph S. Nelson; William J. Farrington; James C. Logomasini

[57] ABSTRACT

The present invention relates to an anti-migratory (as respects impregnated porous sheet members) phenolformaldehyde resole resin in water emulsions. The emulsion is rendered anti-migratory (when impregnated into paper) through the addition thereto of an anti-migratory agent selected from the group consisting of polyelectrolytes, certain salts of inorganic acids, and combinations thereof. The composition is especially useful in the impregnation of filter paper.

8 Claims, 4 Drawing Figures

ANTI-MIGRATORY ADDITIVE FOR EMULSIFIED PHENOLIC RESIN SYSTEMS CONTAINING A PROTEINACEOUS COLLOID

CROSS REFERENCE TO RELATED APPLICATIONS

This application is a division of co-pending application No. 323,680, filed 1/15/73, now U.S. Pat. No. 3,932,333, which is a continuation-in-part of co-pending application Ser. No. 142,905, filed May 13, 1971, now U.S. Pat. No. 3,719,616 which is a continuation-in-part of application Ser. No. 8,679, filed Feb. 4, 1970 and now abandoned.

BACKGROUND OF THE INVENTION

1. Field of the Invention

The present invention relates to phenolic emulsions. More particularly, the present invention relates to resole phenolic resin in water emulsions containing an anti-migratory agent which are used to impregnate cellulosic substrates.

2. Description of the Prior Art

Emulsified phenolics are well known to the prior art and have been recommended for use in the paper industry for impregnating substrates and for use as beater additives for a variety of end uses.

When substantially water based phenolics, i.e., either liquid phenolic resoles or emulsified (in water) phenolic resins are used for the impregnation of paper, there is experienced, during a drying operation after paper treatment, a phenomenon known as migration. Thus, the resin tends to physically move from center regions of a paper sheet to surface regions thereof (i.e., a treated sheet's opposed faces). Thus, in a product sheet member from which volatiles have been removed, the resin tends to be concentrated at or near treated sheet surfaces. Heretofore, this problem has been partially solved by the use of solvent based phenolic resins.

While, for some purposes, resin migration is desirable since there are benefits sometimes achieved by having the phenolic resin near treated paper surfaces, for many purposes, the phenomenon of resin migration presents severe industrial problems since the product treated sheet has a non-uniform resin distribution. For example, resin migration causes loss of strength, reduction in porosity, embrittlement (e.g. poor pleatability), etc. The art, then, has long sought ways of minimizing and even eliminating migration in sheet members treated with emulsifiable phenolic resins.

There has now been discovered a system for minimizing and even substantially eliminating phenolic resin migration in porous woven or non-woven sheet members treated with emulsifiable water based phenolics. Not only does the system of this invention reduce or eliminate phenolic resin migration in treated sheet members, but also the product treated sheet members display surprising improvement in strength, porosity, and flexibility. This new composition of matter results in a very low degree of migration that is unattainable with any known water based system and even the previously mentioned solvent based phenolics. In addition, the system does not suffer from the economic and ecological drawbacks inherent in the use of a solvent based phenolic.

These new compositions of matter are especially useful as impregnating resins for filter paper.

SUMMARY OF THE INVENTION

The present invention relates to an improvement in phenolformaldehyde resole resin in water emulsions. The improvement provides a resulting system with reduced tendency for the resin to migrate (and preferably substantially eliminates migration) when the emulsion is used to treat (e.g., impregnate) a porous sheet member, such as a cellulosic sheet or the like compared to the prior unimproved systems.

The present invention provides a composition of matter comprising in combination:

A. an emulsified phenol-formaldehyde resole resin system of the type comprising phenol-formaldehyde resin dispersed in aqueous medium; and B. an anti-migratory agent for the resin system wherein the antimigratory agent is selected from the group consisting of:
 1. Polyelectrolytes selected from the group consisting of:
    a. acrylic acid homopolymers and copolymers and salts thereof,
    b. copolymers of maleic anhydride and the half-esters and salts of these copolymers,
    c. acrylamide homopolymers and copolymers,
    d. copolymers of vinyl esters and carboxylic acids and salts thereof,
    e. methacrylic acid homopolymers, copolymers and salts thereof,
 2. ammonium and alkali metal salts of hydrochloric and sulfuric acid,
 3. combinations of a polyelectrolyte as defined in (1) above and ammonium and alkali metal salts of hydrochloric and sulfuric acid.

The present invention also relates to a method for making an emulsified modified phenolic resole resin system of the type above described anti-migratory (as respects reduced capacity of such resin to migrate in a porous, sheet-like member after impregnation thereof with such system during drying). The method involves the step of admixing with such systems (before utilization) an aqueous solution of an anti-migratory agent of the type described above to obtain 0.04 to 20.0 parts by weight per 100 parts by weight of solids.

The present invention further relates to a sheet member comprising a preformed porous substrate in integral, sheet-like form comprised of fibrous material (organic, inorganic, or mixtures thereof) in a woven, non-woven, or mixed woven and non-woven form, such substrate having been impregnated with an emulsified phenolic resin system of this invention. Typically, such an impregnated sheet member contains from about 3 to 95 weight percent (based on total impregnated sheet member weight) of solids derived from the emulsified phenolic resin system of this invention. Preferably, this impregnated sheet member has such solids substantially uniformly distributed therethrough.

DESCRIPTION OF THE DRAWINGS

The present invention is better understood by reference to the attached drawings wherein:

Turning to FIG. 1, there is seen illustrated a resin impregnated cellulosic paper sheet member prepared in accordance with the teachings of this invention. Inspection of this vertical sectional view reveals that the resin and other solids derived from the emulsified phenolic system used for treatment are uniformly distributed through the sheet member, and that surprisingly and unexpectedly, after drying there has been substantially no resin migration to upper and lower surfaces of the sheet member during the drying operation to remove volatiles from the treated sheet member. The non-migratory properties of the emulsions of the present invention are further illustrated by FIG. 2. Even under relatively high magnification, individual fibers of the sheet member of FIG. 1 are observed to be uniformly treated with resin, even though such fibers are taken from the mid-region of the sheet member of FIG. 1. Observe that, while in the emulsion used for treatment, the resin was present in the form of little spherules, in the dried, treated sheet member, the individual fibers appear to be uniformly coated with and impregnated with resin.

FIG. 3 illustrates the quantity of anti-migratory additive of the type described in Example 15 (below) needed to achieve approximately equal nonmigration or resin in papers treated with emulsions containing anti-migratory additive at varying solids levels. This curve is only a rough estimate or guide to demonstrate that one should consider changing the weight ratio of anti-migratory additive to emulsifiable phenolic resin if the solids content of the resulting emulsion containing such additive is changed appreciably, assuming that such resulting emulsion is to be used to saturate a paper sheet during treatment (impregnation). Owing to the complex nature of the physical and chemical interrelationships involved, those skilled in the art will appreciate that for treating any particular paper stock with any given emulsion system by some particular treating procedure, the optimum levels of antimigratory additive for differing emulsion resin solids levels and for differing paper basis weights must be arrived at through experience in order to achieve maximum anti-migratory action consistent with other variables present. In general, the concentration of anti-migratory additive in a final emulsion will be in the range of from 0.04 to 20 parts by weight per 100 parts by weight of solids.

Figure 1:
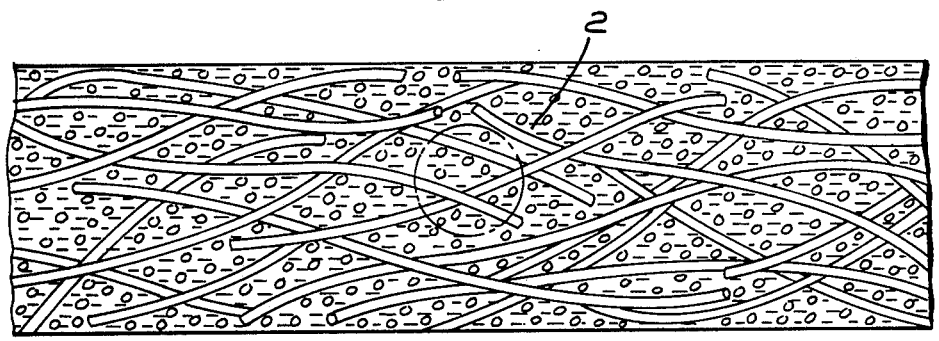
FIG. 1 is an enlarged, vertical, artist's diagrammatic, sectional view through a portion of a cellulosic paper sheet member impregnated with an emulsified phenolic resin system of this invention containing anti-migratory additive.
Figure 2:
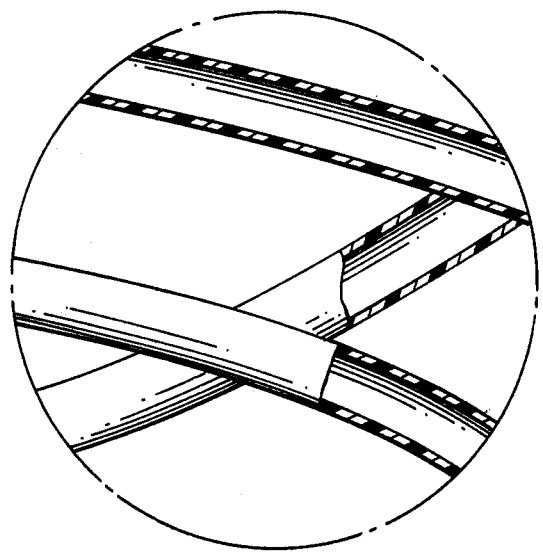
FIG. 2 is a further enlarged view of the sheet member of FIG. 1, some parts thereof broken away and after the volatiles have been removed in a drying operation.
Figure 3:
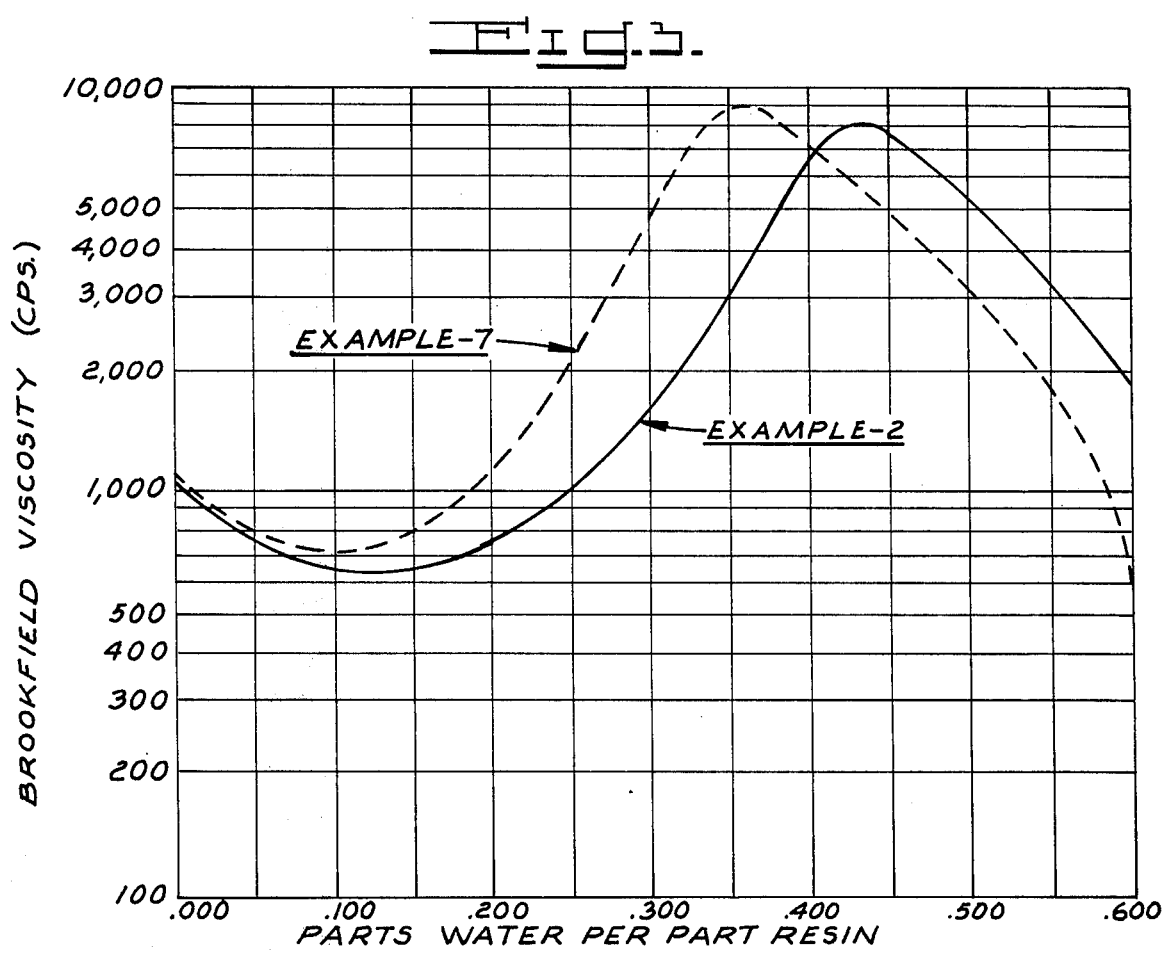
FIG. 3 shows a plot of parts anti-migratory additive solution per 100 parts by weight of initial starting emulsifiable phenolic resin system versus percent total solids present in the product emulsified phenolic resin system containing such additive solution.
Figure 4:
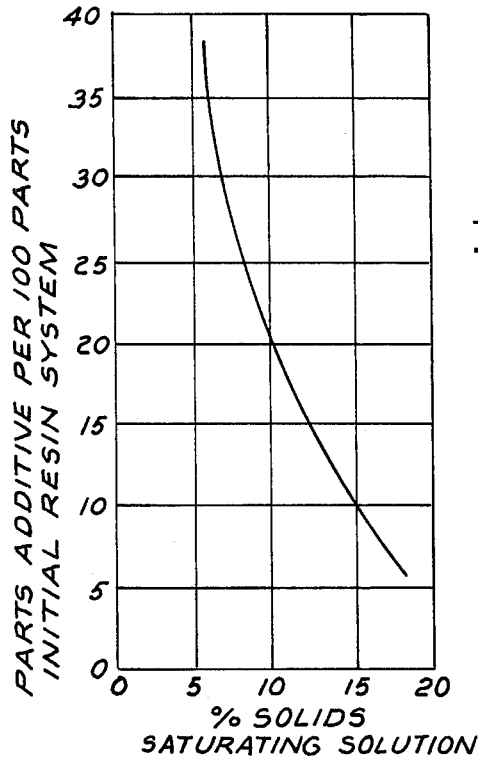

It is an important feature of the present invention that the antimigratory additives described herein may be used with the starting emulsions described herein without rendering the product emulsions so unstable that agglomeration results therein at such a rate as to adversely effect or even prevent the uniform impregnation of resin into sheet members. Obviously, unless the anti-migratory additives are compatible with the starting emulsion system, such are of no value whatever in obtaining the desired end result. It is interesting to note, for example, in this connection that, in general, for all levels of concentration of anti-migratory additive in an emulsion below the level indicated by the curve in FIG. 3, substantially no emulsion instability (resin agglomeration) appears to occur, while for concentrations above such level, emulsion instability tends to occur.

PREFERRED EMBODIMENTS

Characteristically, in the practice of this invention, there is first prepared an emulsifiable phenolic resin system such as known to those skilled in the art. The preferred emulsifiable phenolics particularly suited for use in this invention are characterized as comprising:

A. from about 50 to 80 weight percent total resin solids with the balance up to 100 weight percent thereof being volatile inert solvent liquids, B. the solvent liquids comprising (on a 100 weight percent resin system basis) from 0 to about 45 weight percent of an organic liquid boiling in the range from about 30° to 150° C. with the balance up to 100 weight percent thereof being water, C. the total solids present in said resin system comprising on a 100 weight percent total solids basis:

1. from about 88 to 99 weight percent of a phenol-formaldehyde resole condensate having a formaldehyde to phenol mole ratio of from about 0.85:1 to 3.0:1, a free formaldehyde content of 1.5 percent maximum, a viscosity in methanol solution at 60 weight percent solids of not greater than about 10,000 centipoises, and a water dilutability of from 15 percent to 2000 percent, based on resin solids, and 2. from about 1 to 12 weight percent of a proteinaceous compound soluble in an aqueous media at a pH of from 7 to 10.

Optionally and preferably, the resins solids as above described also include from about (on a 100 weight percent total solids basis) 1 to 15 weight percent of urea and/or dicyandiamide (assuming a corresponding or appropriate reduction in this amount of phenol-formaldehyde condensate).

The organic liquid as described above is generally chosen so as to be substantially inert (as respects the solids) and also is chosen so as to be a mutual solvent for both the solids and the water.

The organic liquid can comprise mixtures of different organic molecules. Preferred organic liquids comprise lower alkanols (such as ethanol, methanol, isopropanol, etc.) and lower alkanones (such as acetone or methylethyl ketone). The term "lower" refers to less than 7 carbon atoms per molecule as used herein.

As made, these liquid, emulsifiable resins are characteristically colored, one-phase, clear liquid solutions having a viscosity ranging from about 50 to 10,000 centipoises, the exact viscosity of a given liquid resin depending upon chemical process and product variables used in manufacture. Further characterizing the phenolic resole resin, it is necessary to keep the free formaldehyde content of the resole condensate below 1.5% maximum in order to permit and facilitate subsequent blending of the proteinaceous protective colloid (which is described in detail below) with the resole condensate. If the free aldehyde content of the resole condensate is greater than 1.5%, gelation of the protective colloid occurs rendering the system non-emulsifiable.

In addition, the phenol-formaldehyde resole condensate must have a water dilutability of from 15 percent to 2000 percent by weight based on resin solids. Water dilutability is a measure of the maximum amount of water which can be added to the condensate without causing haze formation. Water dilutability is inversely related to the degree of resin advancement and if dilutability is too high, the resin will not form an emulsion but rather a solution in the solids range previously mentioned. Furthermore, if the degree of water dilutability is too low then the resin system will either require excessively large amounts of organic solvent to insure a homogeneous one phase condition or will have prohibitively short storage life.

Preferred pheno-formaldehyde resole resins are those which are modified with melamine. In one preferred procedure, melamine is added initially with the phenol and formaldehyde and condenses with formaldehyde concurrently with the phenol. In another preferred procedure, the melamine is added after the formaldehyde and phenol have partially methylolated. In another procedure, melamine-formaldehyde condensate separately prepared is added to a phenol-formaldehyde condensate. In general, the resulting melamine modified product contains from about 2 to 25 parts by weight of melamine per 100 parts of phenol.

Melamine modified resins are preferred because of the improved stability found in emulsion prepared from the emulsifiable melamine modified resoles. For example, these emulsions exhibit substantially no sedimentation even upon storage for six months at room temperature.

The alkali solubilizable proteinaceous compounds used are well known to those of ordinary skill in the art. In general, they are amphoteric but are used in the present invention only at a pH of from 7 to 10.

Suitable aqueous solutions of the proteinaceous compound may therefore be prepared in the presence of alkali and alkaline earth metal hydroxides, ammonium hydroxide, organic amines, e.g., urea, dicyandiamide, triethyl amine, and the like as well as mixtures of the foregoing. The most commonly used proteinaceous materials of this type are casein and soya proteins; common molecular weights range from 100 to 400 thousand.

For use in the current invention, the emulsifiable resole resins previously described are first converted to resin in water emulsions. Alternately, phenolic emulsions known to the art may be also used providing they exhibit sufficient stability when subsequently co-mixed with the anti-migratory agents of this invention.

In the preferred case, the clear, one phase, homogeneous, emulsifiable resins previously described may be easily converted to resin in water emulsions by the simple addition of water with sufficient agitation to permit effective blending of the water. This can normally be accomplished with the use of conventional propellor type agitators. Depending upon the degree of dilutability of the emulsifiable resin, i.e., degree of advancement, the formation of phenolic resole emulsion may be first characterized by a slight lowering of viscosity with the formation of a water-in-resin emulsion and a peak viscosity at the point at which the system inverts to a resin in water emulsion. Such is the case with relatively high degree of advancement of emulsifiable resin systems having a relatively low degree of water dilutability, e.g., 20%. Alternately, with lower advanced phenolic resole emulsifiable resins, emulsification may be accomplished with no noticeable increase in viscosity and result directly in a resin in water emulsion.

Characteristically, the emulsifiable resin form resin emulsions containing 5 to 45 parts by weight of solids, 0 to 20 parts by weight of organic liquid and 35 to 95 parts by weight of water. The solids content is determined by ASTM Test Procedure No. D-115-55. The emulsions comprise spherules of phenolic resin, at least about 80 percent of the spherules ranging in size from about 0.01 to 0.8 microns (as measured for example by electron microscope).

The emulsified phenolics are diluted with water to a specified solids and formulated with the anti-migratory agent. In the impregnation of filter paper, emulsion solids in the range of 5-30 weight percent are preferred, although other solids levels may be used.

The anti-migratory agents of this invention are selected from the group consisting of:

A. water soluble polyelectrolytes selected from the group consisting of:
 1. acrylic acid homopolymers and copolymers and salts thereof,
 2. copolymers of maleic anhydride and the half-esters and salts of these copolymers,
 3. acrylamide homopolymers and copolymers,
 4. copolymers of vinyl esters and carboxylic acids and salts of these copolymers,
 5. methacrylic acid homopolymers, copolymers and salts thereof,
B. ammonium and alkali metal salts of hydrochloric and sulfuric acid,
C. combinations of a polyelectrolyte as defined in (A) above and ammonium and alkali metal salts of hydrochloric and sulfuric acid.

Specific polyelectrolytes used in the present invention include:

A. polyacrylic acid and ammonium and alkali metal salts of these acids wherein the polyacrylic acid has a weight average molecular weight of at least 2,000. Also contemplated for use in this invention are copolymers of acrylic acid which contain up to 50 mole percent of a comonomer such as vinyl acetate.
B. copolymers of maleic anhydride wherein the comonomer is a lower alpha olefin containing from 2 to 4 carbon atoms such as ethylene, propylene, butylene; a vinyl aromatic monomer such as styrene, chlorostyrene, vinyl toluene, etc.; a vinyl ester such as vinyl formate, vinyl acetate, vinyl propionate, vinyl benzoate. Included also are copolymers of maleic anhydride, wherein up to 50 mole percent of the carboxylic acid groups of the maleic anhydride molecule are esterified with a lower alkyl alcohol such as methanol, ethanol, propanol and butanol. Included also are the ammonia and alkali metal salts of the maleic anhydride copolymers and the ester derivatives of these copolymers.
C. polyacrylamide and poly(acrylamide-acrylic) acid copolymers and the ammonium and alkali metal salts of these copolymers.
D. copolymers of acrylic acid and 2-ethyl hexyl acrylate which are prepared according to the teachings of U.S. Pat. No. 2,945,013 which is incorporated herein by reference.
E. polymethacrylic acid and ammonium and alkali metal salts of these acids wherein the polymethacrylic acid has a weight average molecular weight of at least 2,000. Also contemplated for use in this invention are copolymers of polymethacrylic acid which contain up to 50 mole percent of a comonomer such as vinyl acetate.

The polyelectrolyte used in the present invention must be sufficiently water soluble so as to provide a solution concentration in the impregnating emulsion in the range of from 0.04 to 20 percent by weight based on the weight of total system solids in the emulsion. Especially preferred anti-migratory agents for use in the present invention are combinations of the foregoing polyelectrolytes with the ammonium and alkali metal salts of hydrochloric and sulfuric acid. Such combinations appear to have a synergistic effect as regards the migration of resin particles. The amount of inorganic salt which would be used in combination with the polyelectrolyte will depend upon the particular polyelectrolyte and inorganic salt used as well as with the particular phenolic resin emulsion and particular impregnation application involved. However, in these synergistic combinations the ratio of polyelectrolyte to inorganic salt is varied from 1:99 to 99:1. Preferably, the ratio of polyelectrolyte to inorganic salt will be in the range of from 95:5 to 5.95. These synergistic combinations will be discussed in greater detail below in the working examples.

One of the more preferred systems is that which use a combination of a polyacrylate and an ammonium or alkali metal salt of hydrochloric or sulfuric acid. An especially preferred system is a mixture of ammonium chloride or ammonium sulfate and a water soluble polyacrylate.

The water soluble polyacrylate salts used are well known to those of ordinary skill in the art. Molecular weights for such salts can fall in the range of from about 100,000 to 700,000 but higher and lower molecular weights can be employed. Cations for such salts are selected from the group consisting of alkali metals and ammonium. such a salt characteristically has a pH of about 8 to 10, and preferably about 8.5 to 9.5, in a 13 weight percent water solution. In addition, such polymer preferably contains at least about 100 units per molecule of the structure:

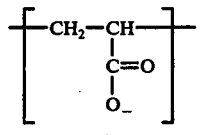

Formula I

Further, it is preferred to use a polyacrylate polymer which may contain up to about 10 weight percent per molecule of units of the structure:

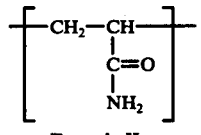

Formula II

Such polyacrylate salt polymers are usually prepared either by polymerizing acrylic acid and then neutralizing with an alkali metal hydroxide or ammonium hydroxide, or, alternatively, by polymerizing acrylonitrile and then hydrolyzing the nitrile groups in alkali (especially aqueous sodium hydroxide) to an extent such that there is produced a polymer containing not more than about 10 weight percent residual units of Formula II above. One preferred polyacrylate salt polymer for use in the present invention is available commercially under the trade designation "Acrysol GS" (a trademark of the Rohm & Haas Company for its brand of a sodium salt of polyacrylic acid containing up to about 10 percent of units of Formula II above). This polymer salt is available commercially as a water solution having a pH in the range of from about 8.5 to 9.5 at about 13 percent solids and further having a viscosity of approximately 10,000 to 20,000 centipoises.

As indicated above, it is preferred to have also dissolved in such anti-migratory additive solution an ammonium salt of a strong inorganic acid. Concentrations of such ammonium salt in such solution typically range from zero to about 30 parts by weight per 100 parts of solids, and preferably from 5 to 20 parts by weight per 100 parts of solids.

Any convenient treating technique such as dipping, coating, spraying, or the like, can be used to impregnate cellulosic substrates. After treating, the treated sheet-like material is dried as in air or an oven to lower the volatiles content and make the treated sheet-like product easily handleable. Usually, the treated sheet-like product is first dried at a temperature below one at which any substantial thermosetting or cross-linking of resin (in the treated substrate sheet-like member) occurs. Thus, common drying temperatures range from about 105° to 175° C. over (inverse) times of from about 1 to 20 minutes, as those skilled in the art appreciate.

Such an intermediate product treated sheet thereafter is usually formed by conventional folding, etc. techniques all well known to those of ordinary skill in the art into a desired configuration. After such a sheet forming operation, the product is subjected to an elevated temperature for a time sufficient to substantially completely thermoset the phenolic resin. Typical curing temperatures range from about 120° to 200° C. for 30 minutes, as those skilled in the art appreciate.

Characteristically, it is during the preliminary drying step when solvent and carrier liquids are removed from a treated sheet-like member that resin migration tends to occur, and, in accordance with the teachings of this invention, it is during this drying operation that the anti-migratory characteristics associated with the product emulsified resin systems of this invention are appreciated. Such reduction in resin migration is surprising and unexpected. No special precautions need be observed during the preliminary drying step in order to realize benefit of the anti-migratory action associated with the emulsions of this invention.

Tackiness in a dry but not thermoset sheet member impregnated with an emulsified phenolic resin system of this invention may be reduced or eliminated by using a phenolic resin which is relatively highly advanced.

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis. Also, unless otherwise stated herein, all components and products have physical and chemical characteristics as hereinabove specifically stated and explained.

The following Examples 1 to 14 illustrate suitable emulsifiable liquid phenolic resins adopted for use in the preparation of emulsions suitable for use as starting materials in this invention.

EXAMPLE 1

The product of this example is a highly advanced, emulsifiable phenolic resin adapted for use with an anti-migratory additive for treating filter paper. Sodium caseinate is the main emulsifier. The following starting materials are used:

| Material | Parts |
| --- | --- |
| Phenol | 100 |
| 50% Formalin | 85 |
| Melamine | 5 |
| 50% Caustic Solution (NaOH) | 1.66 |
| Methanol | 41 |
| Water | 15 |
| Prilled Urea | 6.50 |
| Casein | 6.50 |
| 50% Caustic Solution (NaOH) | 0.38 |

Phenol, 50% formalin, melamine and 50% caustic solution are heated under vacuum to atmospheric reflux (temperature ranges from 100° to 103° C.). The reaction proceeds for 80 minutes after reflux starts. At the end of reflux, the resin is cooled with vacuum and allowed to level at 50° ± 2° C. under 27 inches vacuum. It is then dehydrated to a refractive index of about 1.60. At the end of dehydration, approximately 41 parts of methanol are charged. Finally, a premixed casein solution is added with agitation. A clear, amber colored fluid results.

Premixing of the casein is accomplished as follows: The urea is dissolved in water and the casein is added and slurried. After 30 minutes, the caustic solution is added and allowed to mix for 30 minutes. This solution may then be added to the resin. The product resin has a total solids content (measured by ASTM Test Procedure No. D 115-55) of about 60%.

The foregoing resin is emulsified as follows: Water is added to the resin with sufficient agitation to form an emulsion. It is observed that the agitation is sufficient to prevent formation of lumps. First a water in resin emulsion is formed. As water is added, the viscosity increases until the emulsion inverts to a resin in water emulsion, at which point the viscosity decreases with the addition of more water. The product emulsion is observed to be infinitely dilutable with water. The resin in water emulsion is storage stable and mechanically stable. The emulsion is observed to reach a peak viscosity and invert from a water in resin emulsion to a resin in water emulsion at about 42% solids (as determined by ASTM Test Procedure No. D 115-55).

When a resin in water emulsion prepared as just described and having a solids content of about 10% (same procedure) is cast onto a glass plate, 5 × 7 inches, and then oven dried at a temperature of about 150° C. for 10 minutes, there is produced a thermoset resin film which displays excellent water resistance.

EXAMPLE 2

The procedure and starting materials of Example 1 are repeated except that after the alcohol has been added, but before the casein solution addition, the resin is further advanced by refluxing the system at about 80° C. until the product achieves a gel time of about 7 – 9 minutes, as determined by using a so-called General Electric Gel Test.

The product resin, when water is similarly added, has properties like those associated with the product of Example 1, and, in addition, when a film on glass is similarly cast and air dried at 25° C. for 2 hours, the product film is observed to be substantially non-tacky demonstrating that the product resin is substantially free from sticking tendencies on industrial paper treating equipment when this resin is used for paper sheet impregnation. When this air dried film is then oven dried as in Example 1, the product thermoset film is found to display excellent water resistance.

EXAMPLE 3

| Material | Parts |
| --- | --- |
| Phenol | 100 |
| 50% Formalin | 85 |
| Melamine | 5 |
| 50% caustic Solution (NaOH) | 1.66 |
| Ethanol | 5 |
| Water | 36 |
| Urea | 6.50 |
| Casein | 5.40 |
| 28% Ammonia | .94 |

This reaction proceeds as in Example 1 except that the methanol solvent is replaced by ethyl alcohol. The protective colloid (casein) is prepared as in Example 1 except that the 50% sodium hydroxide is replaced by a 28% ammonia solution. The product resin has a total solids content (measured as ASTM Test Procedure No. D 115-55) of about 64%.

The foregoing resin is emulsified as in Example 1. The product emulsion is observed to be infinitely dilutable with water. The resin in water emulsion is storage stable and mechanically stable. The emulsion is observed to reach a peak viscosity and invert from a water in resin emulsion to a resin in water emulsion at about 45 percent solids (as determined by ASTM Test Procedure No. D 115-55).

When a resin in water emulsion prepared as just described and having a solids content of about 10 percent (same procedure) is cast onto a glass plate 5 × 7 inches and then oven dried at a temperature of about 150° C. for 10 minutes there is produced a thermoset resin film which displays excellent water resistance.

EXAMPLE 4

The following starting materials are used:

| Material | Parts |
| --- | --- |
| Phenol | 100 |
| 50% Formalin | 85 |
| Melamine | 5 |
| 50% Caustic Solution (NaOH) | 1.66 |
| Water | 36 |
| Urea | 6.5 |
| Casein | 5.4 |
| 28% Ammonia | .94 |

The reaction proceeds as in Example 1 except that the alcohol solvent is replaced by water resulting in a completely aqueous system. The protective colloid (casein) is prepared as in Example 1 except that the 50% sodium hydroxide solution is replaced by a 28% ammonia solution. The product resin has a total solids content (measured by ASTM Test Procedure No. D 115-55) of about 64%.

The foregoing resin is emulsified as in Example 1. The product emulsion is observed to be infinitely dilutable with water. The resin in water emulsion is storage stable and mechanically stable. The emulsion is observed to reach a peak viscosity and inverts from a water in resin emulsion to a resin in water emulsion at about 45 percent solids (as determined by ASTM Test Procedure No. D 115-55).

When a resin in water emulsion prepared as just described and having a solids content of about 10 percent (same procedure) is cast onto a glass plate 5 × 7 inches and then oven dried at a temperature of about 150° C. for 10 minutes, there is produced a thermoset resin film which displays excellent water resistance.

EXAMPLE 5

The starting materials and procedure of Example 1 are repeated except that the urea is eliminated. There is produced a product emulsifiable resin which, when emulsified by the procedure of Example 1, has inversion characteristics and water resistance characteristics like those of Example 1.

EXAMPLE 6

The starting materials and procedure of Example 1 are repeated except that dicynadiamide is used in place of urea. There is produced a product emulsifiable resin which, when emulsified by the procedure of Example 1, has inversion characteristics and water resistance characteristics like those of Example 1.

EXAMPLE 7

The following starting materials are used:

| Material | Parts |
| --- | --- |
| Phenol | 100 |
| 50% Formalin | 85 |
| Melamine | 5 |
| 50% Caustic Solution (NaOH) | 1.66 |
| Methanol | 41 |
| Water | 15 |
| Prilled Urea | 6.50 |
| Casein | 6.50 |
| 28% Ammonia | .94 |

The procedure is the same as in Example 2 except that 28% ammonia is used in place of the 50% caustic solution.

Product properties are equivalent to those of Example 2.

Various anionic or nonionic surfactants (such as sodium dioctyl sulfosuccinate or the polyethylene glycols) can be added to all of the above examples without interfering with action of the subsequently added antimigratory additive. The surfactants can contribute to emulsion stability. They are used in the range of 0-5 parts by weight per 100 parts by weight of phenolic resin.

EXAMPLE 8

The starting materials and the procedure is the same as in Example 7 except that 2 parts of sodium dioctyl sulfosuccinate are added to the emulsifiable melamine modified phenol-formaldehyde resin formed.

EXAMPLE 9

The starting materials and the procedure is the same as in Example 7 except that 2 parts of Carbowax 200 (a registered trademark of the Union Carbide Company) are substituted for the sodium dioctyl sulfosuccinate.

EXAMPLE 10

The following starting materials are used:

| Material | Parts |
| --- | --- |
| Phenol | 100 |
| 50% Formalin | 85 |
| Melamine | 5 |
| 50% Caustic Solution (NaOH) | 1.66 |
| Methanol | 41 |
| Water | 15 |
| Prilled Urea | 6.50 |
| Casein | 6.50 |
| 28% Ammonia | .94 |

The procedure is the same as in Example 2 except that 28% ammonia is used in place of the 50% caustic solution.

Product properties are equivalent to those of Example 2.

EXAMPLE 11

Example 1 is repeated here except that 80 parts of formalin are used and the melamine is omitted. The resulting resole condensate is formulated as in Example 1 and used to prepare a resin in water emulsion at about 35% solids. The emulsion is diluted with water to about 10% solids, cast onto a glass plate, 5 × 7 inches, and then oven dried at a temperature of about 150° C. for 10 minutes to produce a thermoset resin film which displays excellent water resistance.

EXAMPLE 12

The general procedure of Example 2 is repeated here using the resole condensate prepared in Example 11. Air dried films on glass are found to be substantially non-tacky demonstrating that the present resin is substantially free from sticking tendencies on industrial paper treating equipment when this resin is used for paper sheet impregnation. Oven dried films are found to display excellent water resistance.

EXAMPLE 13

In this example the starting materials are the same as those used in Example 11. Phenol, 50% formalin and 50% caustic solution are heated under vacuum to an 80° C. reflux. The reaction proceeds for 3 hours after reflux starts. At the end of reflux, the resin is cooled with vacuum and allowed to level at 50° ± 20° C. under 27 inches vacuum. It is then dehydrated to a refractive index of about 1.60. At the end of dehydration, the premixed casein solution is added with agitation. A clear, amber colored fluid results which has a free formaldehyde content of 1.2% and a water dilutability of about 400%.

The foregoing resin is emulsified as follows: Water is added to the resin with sufficient agitation to form an emulsion. As water is added, viscosity decreases to a point at which the solution inverts to an emulsion. The product emulsion is observed to be infinitely dilutable with water. The resin in water emulsion is storage stable and mechanically stable. The emulsion is observed to invert to an emulsion at about 25% solids (as determined by ASTM Test Procedure No. D 115-55).

When a resin in water emulsion prepared as just described and having a solids content of about 10% (same procedure) is cast onto a glass plate, 5 × 7 inches, and then oven dried at a temperature of about 150° C. for 10 minutes, there is produced a thermoset resin film which displays excellent water resistance.

EXAMPLE 14

The starting materials and procedure of Example 13 are repeated except that soya protein replaces the casein used in Example 13. The resulting product is an emulsifiable resin which, when emulsified by the procedure of Example 13, has inversion characteristics and water resistance characteristics like those of Example 13.

The following Examples 15 and 16 illustrate phenol-formaldehyde resole emulsions which are formulated with anti-migratory agents, and sheet members treated therewith.

EXAMPLE 15

A solution of the following ingredients is prepared:

| Material | Parts |
|---|---|
| Water | 100 |
| Acrysol GS (sodium polyacrylate solution) | 100 |
| Ammonium Chloride | 24 |
| 28% Aqueous Ammonium Hydroxide | 5 |

These ingredients are mixed at room temperature until a homogeneous solution is formed. This product solution forms an anti-migratory additive of this invention suitable for adding to emulsified phenolic systems.

To evaluate the foregoing additive, the following procedure is used:

The phenolic resin systems of Examples 1 through 14 (above) are emulsified with water and adequate agitation (sufficient to prevent lump formation) to form a 13 percent solids, resin in water emulsion. Then to each of these resin in water emulsions is added a dilute solution of the anti-migratory additive of this example composed of 25 parts of such anti-migratory additive diluted with 133 parts of water per 100 parts of the phenolic resin solids of each such emulsion. The diluted anti-migratory additive is added in each instance with sufficient agitation to avoid any localized concentration of the anti-migratory additive in the phenolic resin in water emulsion.

Each resulting phenolic resin in water emulsion containing its above-described anti-migratory additive is then evaluated for migration by the following procedure:

A sample of 100 pounds basis weight relatively porous automotive-type filter paper, is saturated with each such additive containing emulsion by dipping the paper until each sheet is completely saturated. Each resulting so-saturated sheet is then dried for 15 minutes at 160° C. in a circulating air oven. At the end of this time, each sheet is removed and examined for resin migration. Examination of a cross-section of each so-processed sheet reveals that the treating resin in each instance is evenly distributed throughout the sheet. Substantially, no resin migration is observed. Control examples which contained no anti-migratory agent exhibited excessive resin migration which seriously affected the performance of the filter paper.

EXAMPLE 16

A solution of the following ingredients is made up of:

| Material | Parts |
|---|---|
| Acrysol GS (sodium polyacrylate solution) | 100 |
| Water | 1350 |

These ingredients are mixed at room temperature until a homogeneous solution is formed. This product solution forms an anti-migratory additive of this invention suitable for adding to emulsified phenolic systems.

To evaluate the foregoing additive, the following procedure is used.

A sample of the phenolic resin from Example 13 (above) is emulsified with water and adequate agitation (sufficient to prevent lump formation) to form a 13 percent solids, resin in water emulsion. Then to this sample of so emulsified resin in water emulsion is added 80 parts of the above anti-migratory additive per 250 parts of the 13 percent solids phenolic resin in water emulsion. This anti-migratory additive is added with sufficient agitation to avoid any localized concentration of the anti-migratory additive in the phenolic resin in water emulsion.

The resulting phenolic resin in water emulsion containing its abovedescribed anti-migratory additive is then evaluated for migration as in Example 15. Examination of a cross-section of each so-processed sheet reveals that the treating resin in each instance is evenly distributed throughout the sheet. Substantially no resin migration is observed.

EXAMPLES 17 to 25

In the following examples, emulsions are prepared from the phenolic resins prepared in Example 1. These emulsions are then formulated with various anti-migratory agents and used to impregnate paper as in Example 15, which is subsequently examined for resin migration. These examples are tabulated in Table 1 below.

Sodium polyacrylate is available from Rohm & Haas Company as Acrysol GS. Polyacrylamide is available from Dow Chemical Company as Separan AP-273. Ethylene maleic anhydride is available from Monsanto Company as EMA 31. Sodium Salt of styrene maleic anhydride is available from Monsanto Company as Stymer S. Polyacrylamide is available from Dow Chemical Company as Separan NP-10.

TABLE I

| | Emulsion by Weight | | | Anti-Migratory Agent Parts by Weight | | |
|---|---|---|---|---|---|---|
| Example | Resin | Water | Formulation | Agent | Water | % Solids |
| 17 | 100 | 424.5 | 100 sodium polyacrylate<br>100 water<br>60 ammonium sulfate | 19 | 95 | 10 |
| 18 | 100 | 257 | same as in Example 17 | 10 | 50 | 15 |
| 19 | 100 | 181 | Same as in Example 17 | 4.5 | 22.5 | 20 |
| 20 | 100 | 325 | 100 water<br>1 polyacrylamide<br>6 ammonium chloride | 17.2 | 86 | 12 |
| 21 | 100 | 378 | 187.5 water<br>12.5 ethylene maleic anhydride<br>24 ammonium chloride | 15.3 | 77 | 11 |
| 22 | 100 | 378 | 187.5 water<br>6.2 copolymer of acrylic acid<br>2-ethyl-hexyl acrylate(95-5) | 15.3 | 77 | 11 |

TABLE I-continued
SUMMARY OF EXAMPLES 17 to 25

| Example | Emulsion by Weight Resin | Emulsion by Weight Water | Formulation | Anti-Migratory Agent Parts by Weight Agent | Anti-Migratory Agent Parts by Weight Water | % Solids |
|---|---|---|---|---|---|---|
| 23 | 100 | 374 | 26 sodium chloride<br>246 water<br>6.25 polyacrylamide | 35.6 | 61.4 | 11 |
| 24 | 100 | 368 | 33 sodium sulfate<br>5 sodium salt of styrene maleic anhydride<br>100 water | 33 | 154 | 9.5 |
| 25 | 100 | 378 | 200 water<br>24 ammonium chloride | 15.3 | 77 | 11 |

Examples 17 to 25 further illustrate some of the variations which are possible in the present invention. Examples 17 to 19 illustrate the inverse relationship that exists between the phenolic resin solids in the emulsion and the amount of anti-migratory agent required. The examples also illustrate some of the wide variations which are possible in the choice of an anti-migratory agent. In this regard Examples 17 to 23 illustrate synergistic mixtures of a polyelectrolyte and a salt of hydrochloric or sulfuric acid. In these examples resin migration is significantly less than in Examples 24 and 25 which contain only a single anti-migratory agent. It should be noted, however, that Examples 24 and 25 show a significant improvement in resin migration over control examples which do not contain an anti-migratory agent.

Paper impregnated with the formulated emulsions of Examples 17 to 25 show substantially no resin migration whereas in the control examples which contain no anti-migratory agent there was severe resin migration which adversely affected the performance of the paper.

The phenolic emulsions of the present invention which contain an anti-migratory agent are used to impregnate a wide variety of substrates. Examples of such substrates include fiber glass insulation, fibrous reinforcing elements used in the preparation of laminates and composite articles, cellulosic materials such as paper, cotton, wood, fiber board, particle board, molding pulp, battery separators, etc. Other uses will become apparent to those skilled in the art upon reading the above specification.

What is claimed is:

1. An emulsified liquid phenolic resin system containing spherules of phenolic resin dispersed in aqueous medium, at least about 80 percent of the spherules ranging in size from about 0.01 to 0.8 microns, and comprising:
   A. a quantity of solids ranging from about 5 to 45 parts by weight, comprising the phenolic resin, a water soluble dissolved proteinaceous protective colloid in basic form, and a water soluble dissolved polyacrylate salt,
   B. a quantity of organic liquid ranging from about 0 to 20 parts by weight, and
   C. a quantity of water ranging from 35 to 95 parts by weight; wherein:
   a. the phenolic resin is characterized by:
      1. having a water dilutability of from 15 percent to 2000 percent based on the resin solids,
      2. having a formaldehyde to phenol combined mole ratio of from about 0.85 to 3.0, and
      3. having a viscosity in methanol solution at 60 weight percent solids concentration of not greater than about 10,000 centipoises;
   b. the polyacrylate salt is characterized by:
      1. having its cations selected from the group consisting of alkali metals and ammonium,
      2. having a molecular weight of from about 100,000 to 700,000,
      3. having a pH of from about 8 to 10 when in a 13 weight percent aqueous solution, and
      4. containing at least about 100 units per molecule of the structure:

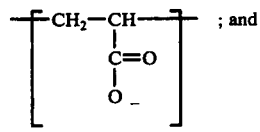

; and c. the ratio of phenolic resin to proteinaceous colloid is in the range of 99:1 and 88:12, the ratio of phenolic resin to polyacrylate salt is in the range of 98.6:0.4 and 70.4:20, and the solids comprise between 0.04 and 20 parts by weight of polyacrylate salt per 100 parts of solids.

2. The phenolic resin emulsion of claim 1 in addition from 0 to 30 parts by weight of a dissolved ammonium salt of hydrochloric or sulfuric acid per 100 parts by weight of the solids.

3. The phenolic resin emulsion of claim 1 wherein the proteinaceous protective colloid is casein.

4. The phenolic resin emulsion of claim 1 wherein the polyacrylate salt contains in addition up to about 10 weight percent per molecule of units of the structure:

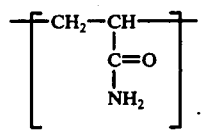

5. The phenolic resin emulsion of claim 11 containing in addition from 0 to 5 parts by weight of a surfactant selected from the group consisting of anionic and nonionic surfactants per 100 parts by weight of the phenolic resin.

6. A method for making an emulsified liquid phenolic resin system anti-migratory wherein such system contains spherules of phenolic resin dispersed in aqueous medium at least about 80 weight percent of the spherules ranging in maximum dimension from about 0.01 to 0.8 microns, and further contains:
   A. a quantity of solids ranging from about 5 to 45 parts by weight, comprising the phenolic resin and a water soluble dissolved protenaceous protective colloid in basic form, in the weight ratio in the range of 99:1 and 88:12;

B. a quantity of organic liquid ranging from about 0 to 20 parts by weight, and
C. a quantity of water ranging from 35 to 95 parts by weight; wherein the phenolic resin is characterized by:
  1. having a water dilutability of from 15 percent to 2000 percent based on the resin solids,
  2. having a formaldehyde to phenol combined mole ratio of from about 0.85 to 3.0, and
  3. having a viscosity in methanol solution at 60 weight percent solids concentration of not greater than about 10,000 centipoises;

which comprises admixing with such system an aqueous solution of a water soluble polyacrylate salt containing from about 0.04 to 20 parts by weight of the salt per 100 parts of solids of the combined liquid phenolic resin system and the aqueous solution, wherein the polyacrylate salt is characterized by:
  1. having its cations selected from the group consisting of alkali metals and ammonium;
  2. having a molecular weight of from about 100,000 to 700,000,
  3. having a pH of from about 8 to 10 when in a 13 weight percent aqueous solution, and
  4. containing at least about 100 units per molecule of the structure:

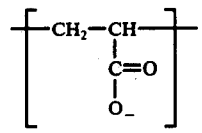

7. The method of claim 6 wherein the emulsified system additionally contains from 0 to about 30 parts by weight of a dissolved ammonium salt of a strong inorganic acid per 100 parts of solids.

8. The method of claim 6 wherein the polyacrylate salt contains in addition up to about 10 weight percent per molecule of units of the structure:

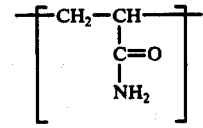

* * * * *